(12) United States Patent
Shimizutani et al.

(10) Patent No.: US 9,214,132 B2
(45) Date of Patent: Dec. 15, 2015

(54) ELECTRONIC CHART DISPLAY DEVICE AND METHOD OF DISPLAYING INFORMATION RELATING TO ELECTRONIC CHART

(71) Applicant: Furuno Electric Co., Ltd., Nishinomiya (JP)

(72) Inventors: Ryu Shimizutani, Nishinomiya (JP); Masato Okuda, Kyoto (JP); Masami Tagawa, Takasago (JP); Tomihiko Oda, Nishinomiya (JP); Takatoshi Morita, Nishinomiya (JP); Petri Turkulainen, Espoo (FI)

(73) Assignee: Furuno Electric Co., Ltd., Nishinomiya (JP)

( * ) Notice: Subject to any disclaimer, the term of this patent is extended or adjusted under 35 U.S.C. 154(b) by 143 days.

(21) Appl. No.: 13/861,238

(22) Filed: Apr. 11, 2013

(65) Prior Publication Data

US 2013/0271492 A1 Oct. 17, 2013

(30) Foreign Application Priority Data

Apr. 11, 2012 (JP) .................................. 2012-090439

(51) Int. Cl.
*G09G 5/00* (2006.01)
*G09G 5/377* (2006.01)
*G01C 21/20* (2006.01)
*G01C 21/22* (2006.01)

(52) U.S. Cl.
CPC ............. *G09G 5/006* (2013.01); *G01C 21/203* (2013.01); *G01C 21/22* (2013.01); *G09G 5/377* (2013.01); *G09G 2340/12* (2013.01)

(58) Field of Classification Search
CPC ............. G09G 5/14; G09G 2340/10; G09G 2340/125; G06T 11/60; H04N 5/44504
USPC ............................ 345/619, 629; 701/410, 420
See application file for complete search history.

(56) References Cited

U.S. PATENT DOCUMENTS

| 6,636,802 | B1 * | 10/2003 | Nakano et al. | 701/532 |
| 8,630,991 | B2 * | 1/2014 | Rao | 707/706 |
| 2006/0085124 | A1 * | 4/2006 | Suzuki | 701/211 |
| 2009/0136031 | A1 * | 5/2009 | Cho et al. | 380/210 |
| 2009/0289927 | A1 * | 11/2009 | Robin et al. | 345/204 |
| 2010/0023255 | A1 * | 1/2010 | Nambata | 701/201 |
| 2010/0146436 | A1 * | 6/2010 | Jakobson et al. | 715/800 |
| 2010/0321399 | A1 * | 12/2010 | Ellren et al. | 345/587 |
| 2012/0011069 | A1 * | 1/2012 | Kazawa et al. | 705/59 |
| 2012/0072107 | A1 * | 3/2012 | Okude et al. | 701/416 |
| 2013/0111368 | A1 * | 5/2013 | Laughlin | 715/760 |

FOREIGN PATENT DOCUMENTS

JP 2003005630 A 1/2003

* cited by examiner

*Primary Examiner* — Todd Buttram
(74) *Attorney, Agent, or Firm* — Alleman Hall McCoy Russell & Tuttle LLP

(57) ABSTRACT

An electronic map display device is provided. The device acquires electronic maps and displays the electronic maps, each electronic map being acquired per acquisition unit. The electronic map display device may include a map information display determiner for determining whether the electronic map is currently available per acquisition unit, and a map information display interface for displaying information relating to the electronic map per the acquisition unit depending on whether the electronic map is currently available.

8 Claims, 8 Drawing Sheets

ELECTRONIC CHART DISPLAY DEVICE AND METHOD OF DISPLAYING INFORMATION RELATING TO ELECTRONIC CHART

CROSS-REFERENCE TO RELATED APPLICATION(S)

The application claims priority under 35 U.S.C. §119 to Japanese Patent Application No. 2012-090439, which was filed on Apr. 11, 2012, the entire disclosure of which is hereby incorporated by reference.

TECHNICAL FIELD

The present invention generally relates to an electronic nautical chart display device.

BACKGROUND OF THE INVENTION

Conventionally, as navigation equipments, electronic nautical chart display systems have been known, which include systems so called ECDIS (Electronic Chart Display and Information System) and ECS (Electronic Chart System). These systems display electronic nautical charts on a computer screen based on electronic nautical chart data.

Electronic nautical charts are generally purchased separately from electronic chart display systems themselves. Such electronic nautical charts are electronic data created based on measurement data from waterways authorities and information illustrated on paper nautical charts. Therefore, each electronic nautical chart is recorded with a different range of marine areas and has different level of detail in recorded data. There published various electronic nautical charts for different recorded ranges and with different levels in details, for various marine areas in the world. Users can choose the electronic nautical chart which he himself or she herself needs, and purchase and acquire (download) to use it. The unit of data of electronic nautical chart that can be acquired by a user in one acquisition is herein referred to as "acquisition unit."

When the user purchases the electronic nautical chart, he/she acquires data of the electronic nautical chart and installs it into an electronic nautical chart display system. The user also acquires a license of the purchased electronic nautical chart. Only when the electronic nautical chart data is installed into the electronic nautical chart system and the license of the electronic nautical chart is valid, the chart can be used.

In this regard, JP2003-005630A, although it is not related to an electronic nautical chart, discloses a navigation device with which a user can use, by selecting an area to purchase from a range which is sectionalized in advance, map data corresponding to the selected area.

As described above, the use of the electronic nautical chart display system can purchase and acquire (download) an acquisition unit of the electronic nautical chart at a time. However, when a plurality of electronic nautical charts are purchased and the number of purchased electronic nautical charts is excessive, it is difficult for the user to grasp whether the data of each electronic nautical chart has been installed, and whether the license of each electronic nautical chart has been acquired.

In addition, each electronic nautical chart is periodically updated and update information is provided thereto. For the safety of navigation, it is desired that the electronic nautical chart is updated to the latest version. However, when a plurality of electronic nautical charts is purchased and the number of electronic nautical charts is excessive, it is difficult for the user to grasp whether each electronic nautical chart has been updated.

Moreover, since various kinds of electronic nautical charts for different recorded ranges and with different levels in details are prepared, it may be required to purchase more than one kind of electronic nautical chart per marine area. For example, when calling at a port during ocean navigation, in addition to a nautical chart for a wide range, a detailed nautical chart for the inside of the port will also be needed. However, when a number of electronic nautical charts are required, it may be difficult for the user to grasp which electronic nautical chart has already been purchased. Therefore when newly purchasing an electronic nautical chart, it may be difficult for the user to determine which electronic nautical chart should be purchased.

Thus, since various kinds of electronic nautical charts with different recorded ranges and levels in details are individually provided to the electronic nautical chart display system, it is extremely difficult for the user to accurately grasp the status of the purchased electronic nautical charts (e.g., whether the data has been acquired, whether the license has been acquired, or whether the data has been updated). In this regard, the navigation device disclosed in JP2003-005630A has the configuration in which the one kind of map data which is installed in the device in advance is sectionalized, and the user chooses an area to use from the map data; therefore, it is considered that there is no difficulty for the user to grasp the purchased map data in particular. However, there is no description in JP2003-005630A in view of facilitating the grasp of the purchased map data by the user, in the first place.

SUMMARY OF THE INVENTION

The present invention is made in view of the above situation, and it provides an electronic nautical chart display device that can easily grasp the status of an electronic nautical chart per acquisition unit.

According to an aspect of the invention, an electronic map display device is provided. The device acquires electronic maps and displays the electronic maps, each electronic map being acquired per acquisition unit. The electronic map display device includes a map information display determiner for determining whether the electronic map is currently available per acquisition unit, and a map information display interface for displaying information relating to the electronic map per the acquisition unit depending on whether the electronic map is currently available.

In this manner, it can be easily grasped per acquisition unit that whether the electronic map is available.

The map information display interface may vary a display mode of the information relating to the electronic map depending on whether data of the electronic map has been acquired.

In this manner, it can easily grasped per acquisition unit that whether the electronic map is installed.

The map information display interface may vary a display mode of the information relating to the electronic map depending on whether a license of the electronic map has been acquired.

In this manner, it can easily be grasped per acquisition unit that whether the license of the electronic map has been acquired.

The map information display interface may vary a display mode of the information relating to the electronic map depending on whether data of the electronic map has been updated.

In this manner, it can easily be grasped per acquisition unit that whether the electronic map data has been updated.

The electronic map display device may at least include a rough map display controller for displaying a rough map in a display mode where the map is at least changeable in scale and scrollable. The map information display interface may graphically display the information relating to the electronic map by superimposing on the rough map.

In this manner, the status of the electronic map can be instinctively grasped per acquisition unit.

The map information display interface may graphically display information regarding a range of an area recorded in the electronic map as the information relating to the electronic map, by superimposing on the rough map, and the map information display interface may vary the display mode of the area range information depending on a status of the electronic map.

By displaying the range of the area recorded in the electronic map on the rough map as described above, the contents of the electronic map may be instinctively grasped per acquisition unit. Additionally, by varying the display mode of the area range information depending on the status of the electronic map, the status of the electronic map may be instinctively grasped per acquisition unit.

The rough map display controller may display the rough map by the Mercator projection when the scale of the rough map is larger than a predetermined scale, and the rough map display controller may perform a coordinate transformation on the rough map and displays the transformed rough map, so that the globe in the rough map is displayed by the orthographic projection when the scale of the rough map is smaller than the predetermined scale. The map information display interface may perform the coordinate transformation on the area range information and display the transformed range depending on the display mode of the rough map.

Specifically, when a wide range is displayed by the Mercator Projection, an area ratio cannot accurate be grasped because of a difference of latitude. Thus, it is preferred to display the globe three-dimensionally when the scale is small. On top of this, by coordinate-transforming and displaying the recorded range of the electronic map, the recorded range can accurately be displayed on the rough map.

The map information display unit may display statuses of the respective electronic maps into a list, as the information relating to the electronic maps.

By displaying the status of the electronic map into the list as described above, the more detailed information relating to the electronic map can be presented to a user per acquisition unit The electronic map display device may include a route setter for setting a scheduled route as well as displaying the scheduled route by superimposing on the electronic map, and a passing schedule map information display controller for graphically displaying information regarding a range showing an area that is recorded in the electronic map recording at least a part of an area where the scheduled route passes. The passing schedule map information display controller may vary the display mode of the area range information depending on whether the electronic map corresponding to the area range information is currently available.

In this manner, it can be grasped visually on the electronic map, that whether the electronic map required for navigating the set route is available.

The electronic map display device may also include a route setter for setting a scheduled route, and a passing schedule map information display controller for displaying statuses of the respective electronic maps into a list, each electronic map recording at least a part of an area where the scheduled route passes.

In this manner, the status of the electronic map required for navigating the set route can easily be grasped.

According to another aspect of the invention, a method of displaying, in an electronic map display device for acquiring electronic maps and displaying the electronic maps, information relating to the electronic maps, each electronic map being acquired per acquisition unit, is provided. The method includes determining whether the electronic map is currently available per acquisition unit; and displaying the information relating to the electronic map per the acquisition unit depending on whether the electronic map is currently available.

In this manner, it can easily grasped per acquisition unit that whether the electronic map is available.

BRIEF DESCRIPTION OF THE DRAWINGS

The present disclosure is illustrated by way of example and not by way of limitation in the figures of the accompanying drawings, in which the like reference numeral indicate like elements and in which.

DETAILED DESCRIPTION

Figure 1:
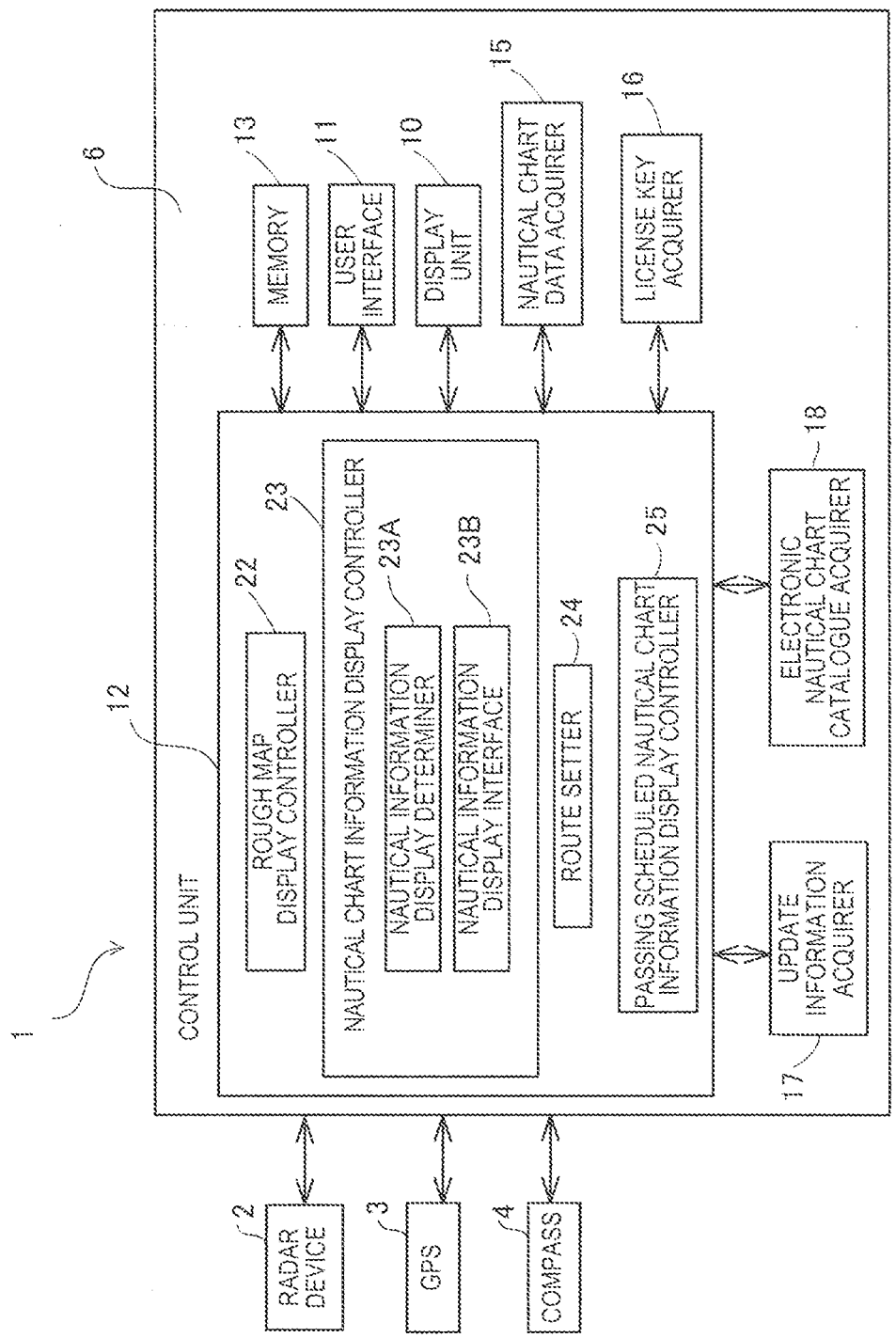
FIG. 1 is a block diagram showing a configuration of an electronic nautical chart display device according to one embodiment of the invention.

Next, one embodiment of the present invention is described with reference to the appended drawings. FIG. 1 is a block diagram showing an electronic nautical chart display and information system (ECDIS) 1 including an electronic nautical chart display device 6 according to this embodiment of the invention.

The electronic nautical chart display and information system 1 is equipped on a ship and displays various information required for navigation. The electronic nautical chart display and information system 1 includes a radar device 2, a GPS (Global Positioning System) receiver 3, a gyrocompass 4, and the electronic nautical chart display device 6 (electronic map display device).

The radar device 2 has a well-known configuration of acquiring a state of object(s) around the ship through transceiving radio waves by an antenna, and creating a two-dimensional image (radar image) showing the state of the object(s) around the ship. The radar image created by the radar device 2 can be displayed on the electronic nautical chart display device 6. The GPS receiver 3 has a known configuration of acquiring terrestrial absolute coordinates of the ship based on signals from GPS satellites. The absolute coordinates of the ship acquired by the GPS receiver 3 is outputted to the electronic nautical chart display device 6. The gyrocompass 4 acquires a heading of the ship. The heading acquired by the gyrocompass 4 is outputted to the electronic nautical chart display device 6.

The electronic nautical chart display device 6 displays electronic nautical charts (electronic maps). The electronic nautical chart display device 6 includes a display unit 10, a user interface 11, a control unit 12, a memory 13, a nautical chart data acquirer 15, a license key acquirer 16, an update information acquirer 17, and an electronic nautical chart catalogue acquirer 18.

The user interface 11 is configured with an input device which a user can control, such as a mouse (pointing device) or a keyboard. The display unit 10 is a liquid crystal display where a color display is available, and can appropriately display the electronic nautical charts.

The memory 13 is a hard disk or the like, and is stored with acquired data of the electronic nautical charts. The data of each electronic nautical chart is provided from a provider of the electronic nautical chart data (hereinafter, simply referred to as "the provider"), via a memory media such as a CD-ROM. The nautical chart data acquirer 15 acquires data of the electronic nautical chart by reading the CD-ROM, and installs it into the memory 13. Note that, considering the recent generalization in the provision of electronic nautical chart data by satellite communication, the nautical chart data acquirer 15 may be configured to acquire the electronic nautical chart by the satellite communication. Alternatively, the electronic nautical data can also be acquired by other suitable methods.

Note that, the electronic nautical chart handled by the electronic nautical chart display device 6 of this embodiment may be a vector nautical chart which is referred to as the electronic navigational chart (ENC), or may be a raster nautical chart which is referred to as the raster navigational chart (RNC). Note that, the terms "ENC" and "RNC" generally indicate charts that are published by public institutions; however, other than these, including unofficial (private) nautical charts, can be handled by the electronic nautical chart display device 6 of this embodiment.

In many cases, the data of the electronic nautical chart is encrypted when provided, and the electronic nautical chart cannot be used without acquiring a license key. The license key acquirer 16 acquires the license key which is informed from the provider by a suitable method. By acquiring g the license key, the data of the electronic nautical chart installed in the memory 13 can be used. Note that, the incense key is supplied for each acquisition unit of the electronic nautical chart. Therefore, the license key needs to be acquired for each acquisition unit. Moreover, each license key has a period of validity, and thus, a new license key needs to be acquired when the period of validity has expired.

The electronic nautical chart is periodically updated. The information data for the update is provided from the provider. The update information acquirer 17 acquires the update information data and updates the data of the electronic nautical chart installed in the memory 13, to the latest state. The update information data from the provider can be acquired by a suitable method, such as, a memory media (e.g., CD-ROM), attached file on an electronic mail, or satellite communication. Note that, the electronic nautical chart is normally updated at a cycle that the waterways authority of the marine area which is relevant to the chart to be updated publish nautical chart update information. Therefore, the update period of the electronic nautical chart is different for each acquisition unit, and the update work is required to be performed separately for each acquisition unit of the electronic nautical chart.

In addition, the provider of the electronic nautical chart distributes catalogue data including information relating to the electronic nautical chart which is provided by the provider. The electronic nautical chart catalogue acquirer 18 acquires the catalogue data. The catalogue data can be acquired by a suitable method, such as, a memory media (e.g., CD-ROM), attached file on an electronic mail, or satellite communication.

The control unit 12 is configured as a computer including a CPU or other processor, volatile memory such as random access memory (RAM) and non-volatile memory such as Read Only Memory (ROM). Further, the memory 13 is stored with software, such as, an electric nautical chart display program (electronic map display program) which is performed by the control unit 12. Further, the electronic nautical chart display device 6 performs the electronic nautical chart display program stored in the memory 13, by the control unit 12, and thereby, the control unit 12 functions as a rough map display controller 22, a nautical chart information display controller 23 (map information display unit), a course setter 24, a passing schedule nautical chart information display controller 25 (passing schedule map information display controller).

Figure 2:
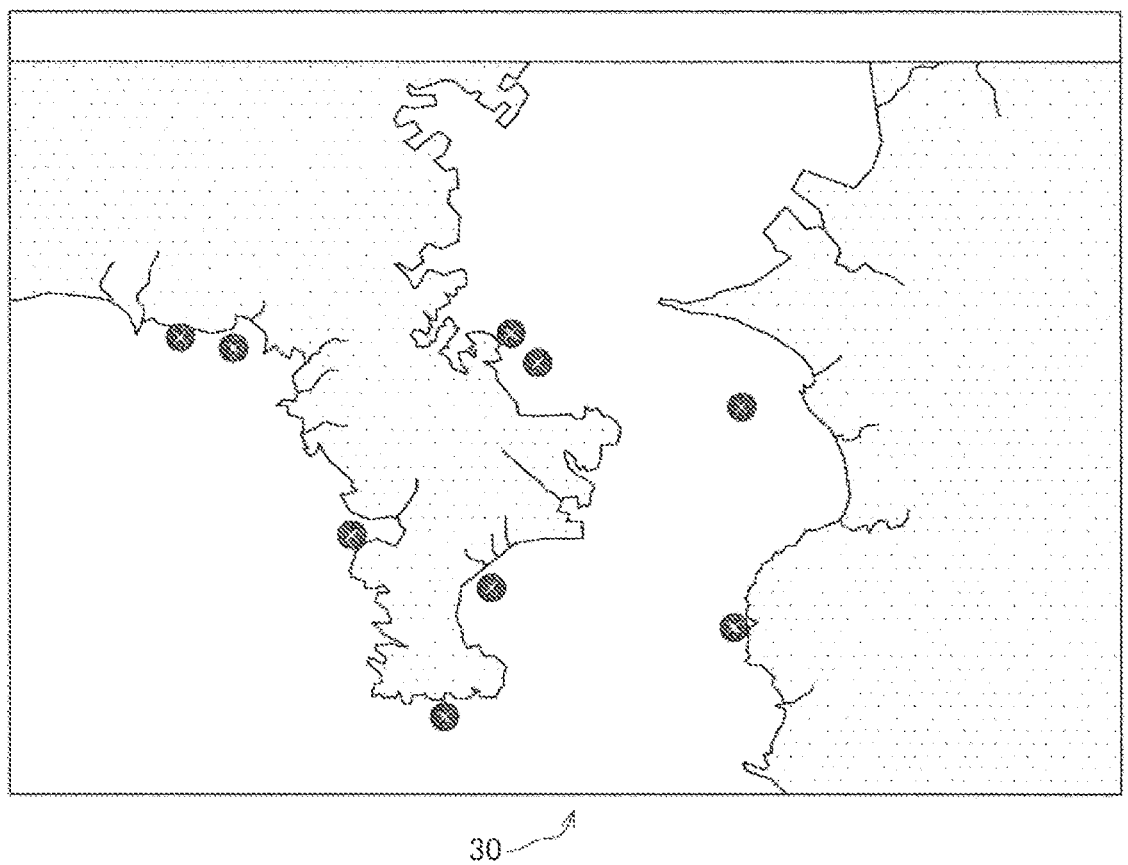
FIG. 2 is a view showing one example of a nautical chart display screen.

The control unit 12 displays the electronic nautical chart on the display unit 10 based on the data of the electronic nautical chart stored in the memory 13. One display example of the electronic nautical chart on the display unit 10 (nautical chart display screen 30) is shown in FIG. 2. The control unit 12 can display the nautical chart according to a position and traveling direction of the ship based on the information obtained from the GPS receiver 3 and the gyrocompass 4, etc. Note that, since the configuration of displaying the nautical chart based on the data of the electronic nautical chart is known, the detailed description thereof is omitted.

Next, a characteristic configuration of the electronic nautical chart display device 6 in this embodiment is described.

Figure 3:
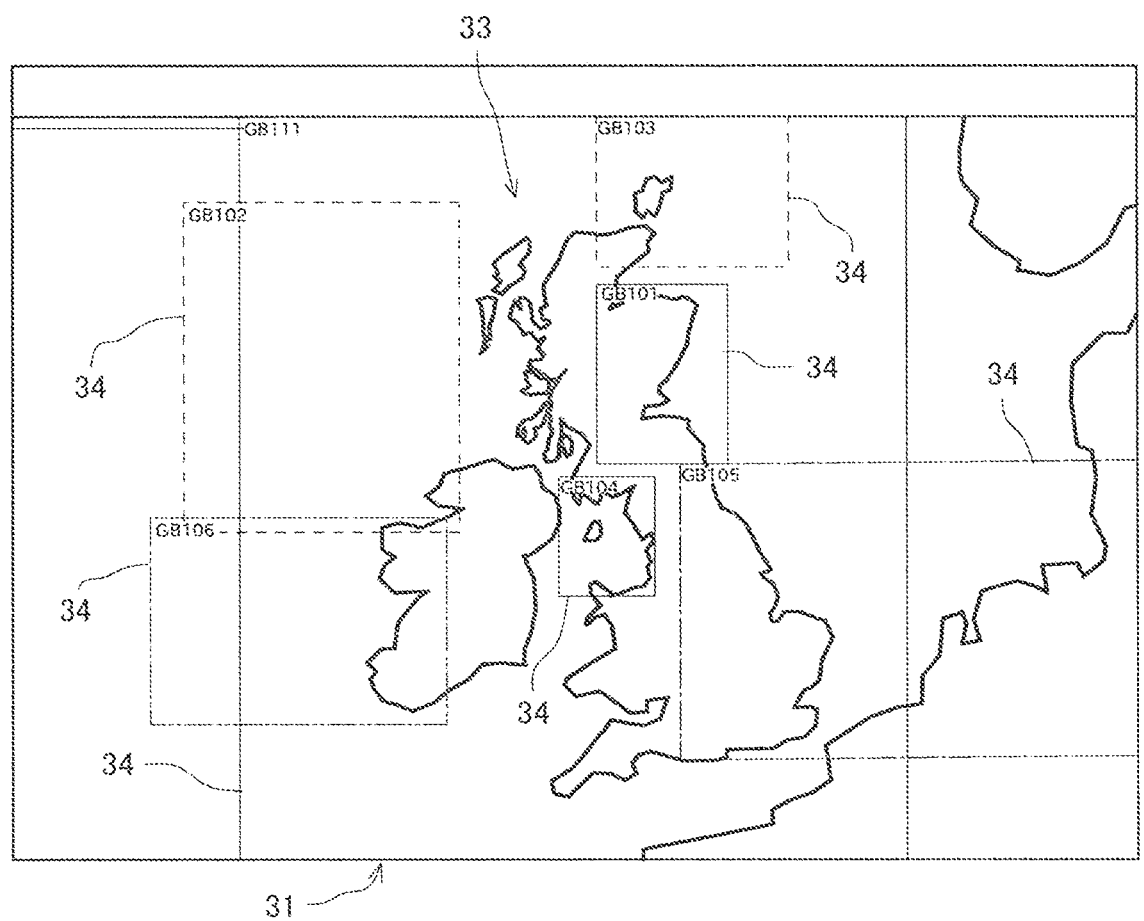
FIG. 3 is a view showing one example of a nautical chart information screen.

The electronic nautical chart display device 6 of this embodiment can display the nautical chart information screen 31 shown in FIG. 3, on the display unit 10. Note that, the nautical chart display screen 30 can be switched to the nautical chart information screen 31 by a suitable operation performed by the user.

As shown in FIG. 3, the rough chart display controller 22 displays a rough chart 33 (rough map) roughly showing the shape of the coastline, in the nautical chart information screen 31. The rough chart 33 is not created from the electronic nautical chart data, but is created based on global coastline data which is stored in the memory 13 in advance separately to the electronic nautical chart. Therefore, the rough chart 33 can also include a marine area where the electronic nautical chart data cannot be used.

The rough chart display controller 22 changes a scale and displayed central coordinates of the rough chart 33 according to the suitable operation by the user. In this manner, the user can arbitrarily change in scale of and scroll the rough chart 33, and therefore, can display the rough chart 33 for a desired marine area, on the nautical chart information screen 31.

Figure 4:
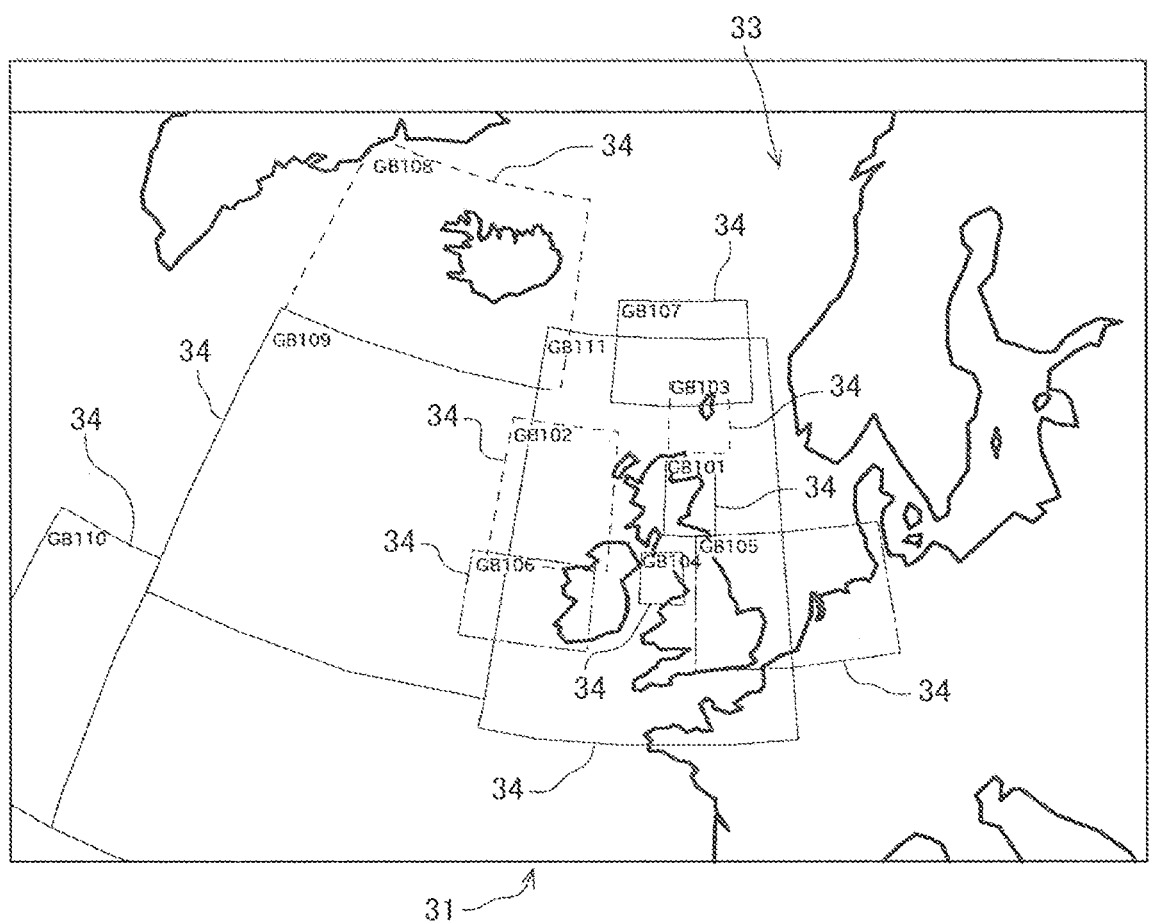
FIG. 4 is a view showing one example of the nautical chart information screen where the globe is illustrated three-dimensionally.

When the scale of the rough chart 33 is larger than a predetermined scale, the rough chart display controller 22 displays the rough chart 33 two-dimensionally by the Mercator projection (FIG. 3). However, with the Mercator projection, when a wide range is displayed, the area ratio is not accurate in the display because of a difference of latitude. Thus, when the scale of the rough chart 33 is set below the predetermined scale, the rough chart display controller 22 performs the coordinate transformation on the rough chart 33 and displays it so that the globe appears in a three-dimensional spherical shape (FIG. 4). Note that, even in the state where the globe is displayed three-dimensionally, the user can arbitrarily change in scale (zoom in/out) of and scroll (turn the globe) the rough chart 33.

The nautical chart information display controller 23 includes a nautical chart information display determiner 23A and a nautical chart information display interface 23B. Since the conventional configuration can be applied to the nautical chart information display determiner 23A, the detailed description thereof is omitted. The nautical chart information display interface 23B displays the information relating to the electronic nautical chart on the nautical chart information screen 31, per acquisition unit. In this embodiment, as shown in FIGS. 3 and 4, the nautical chart information display controller 23 displays, as information relating to the electronic nautical chart, recorded range display frames 34 (area range information) by superimposing it in the rough chart 33. Note that, the area range information is arbitrary as long as the area is indicated thereby. For example, the area range information may be a frame indicating the range of the area and displayed slightly outside of the range of the area.

Each of the recorded range display frames 34 graphically displays, in the rough chart 33, an exterior edge of a range (recorded range) of the marine area (area) recorded in each electronic nautical chart. Moreover, a name of the corresponding acquisition unit of the electronic nautical chart (GB101, GB102, . . . , etc.) is displayed near the recorded range display frame 34. Therefore, the user can easily grasp each marine area range recorded in the electronic nautical chart per acquisition unit, by looking at the display of the recorded range display frames 34 in the rough chart 33.

The information per acquisition unit of the electronic nautical chart (specifically, the name and recorded range of the acquisition unit) can be acquired based on the catalogue data which is acquired by the electronic nautical chart catalogue acquirer 18. Note that, the catalogue data distributed by the provider includes the information relating to the electronic nautical chart which is not yet purchased by the user. Therefore, the nautical chart information display controller 23 can also display the recorded range of the unpurchased electronic nautical chart in addition to the recorded range of the purchased electronic nautical chart.

The nautical chart information display controller 23 firstly acquires the information showing each of the recorded ranges of the electronic nautical charts (including the electronic nautical chart which is currently available, and additionally, the electronic nautical charts which are currently not available, such as the unpurchased chart and the chart of which the license is expired), from the catalogue data. Subsequently, the nautical chart information display controller 23 acquires a coordinate system on the display screen, of the rough chart 33 displayed in the nautical chart information screen 31. The nautical chart information display controller 23 performs the coordinate transformation of each recorded range of the electronic nautical charts to the coordinate system on the display screen of the rough chart 33. Note that, this coordinate transformation can appropriately be performed when the rough chart 33 is displayed by the Mercator projection (FIG. 3), as well as when the globe is displayed by the orthographic projection (FIG. 4).

Additionally, the nautical chart information display controller 23 displays the recorded range display frame 34 indicating the exterior edge of the recorded range of the electronic nautical chart by superimposing it on the rough chart 33. In this manner, when the rough chart 33 is displayed by the Mercator projection (FIG. 3), as well as when the globe is displayed by the orthographic projection (FIG. 4), the recorded range of the electronic nautical chart is properly displayed in the rough chart 33.

Moreover, the nautical chart information display controller 23 updates the display of each recorded range display frame 34 when the user changes in scale (zoom in/out) of and/or scrolls the rough chart 33 by performing the suitable operation. Specifically, the recorded range display frame 34 changes in scale and/or scrolls in conjunction with the operation of changing in scale and/or scrolling by the user. Therefore, the user can suitably sets the display range through changing in scale and/or scrolling the rough chart 33 so that only the information relating to the electronic nautical chart for the desired marine area is displayed on the nautical chart information screen 31.

Moreover, the nautical chart information display controller 23 of this embodiment varies the display mode of the information relating to the electronic nautical chart depending on the status of the electronic nautical chart.

Figure 5:
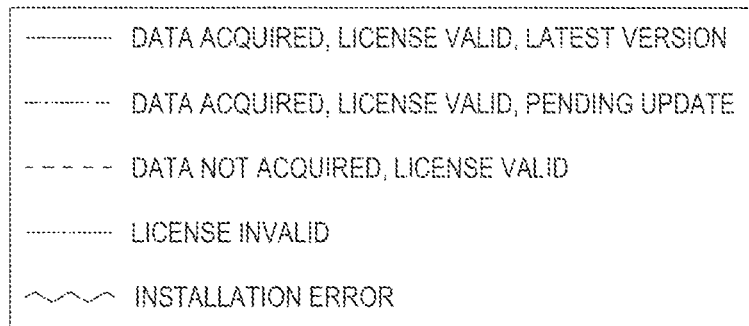
FIG. 5 is a view illustrating a corresponding relation between a display mode of a recorded range display frame and a status of an electronic nautical chart.

More specifically, the nautical chart information display controller 23 of this embodiment varies the display mode of the recorded range display frame 34 depending on the status of the electronic nautical chart corresponding thereto. For example, in FIGS. 3 and 4, the line types of the recorded range display frames 34 are varied to be the solid line, the chain line, the one-dotted chain line, and the double-dotted chain line, depending on the status of the electronic nautical chart. One example of a corresponding relation between the line type of the recorded range display frames 34 and the status of the electronic nautical chart is shown in FIG. 5. Note that, the corresponding relation in FIG. 5 is merely an illustration, and is not limited to this.

By differentiating the display mode of the recorded range display frame 34 depending on the status of the electronic nautical chart as described above, the status of the electronic nautical chart can easily be grasped per acquisition unit. For the status of the electronic nautical chart, various kinds of statuses can be considered. If the electronic nautical chart which is currently available can be varied from the electronic nautical chart which is currently not available, by glancing at the nautical chart information screen 31 of FIG. 3 or FIG. 4, it will be convenient for the user. Thus, it is preferred to differentiate the display mode of the recorded range display frame 34 by at least depending on the availability of the electronic nautical chart.

Therefore, the nautical chart information display controller 23 of this embodiment determines the availability of the electronic nautical chart for each acquisition unit. As described above, with the electronic nautical chart display device 6 of this embodiment, the electronic nautical chart becomes available only after acquiring the data of the electronic nautical chart and acquiring the license of the same electronic nautical chart validly. Thus, the nautical chart information display determiner 23A of the nautical chart information display controller 23 of this embodiment determines, for each electronic nautical chart recorded in the catalogue data, whether the electronic nautical chart data is acquired, and whether the license of the electronic nautical chart is acquired. Then, based on the determination results thereof, the nautical chart information display controller 23 varies the display mode of the recorded range display frame 34.

In this manner, the user can determine which electronic nautical chart is currently available and which is not, by simply glancing the nautical chart information screen 31. For example, since the user can determine whether the data of the electronic nautical chart for the marine area scheduled for navigation is acquired by simply glancing the nautical chart information screen 31, when the data is not yet acquired, it can be determined that the data needs to be acquired from the provider. Additionally, for example, since the user can determine whether the license of the electronic nautical chart for the marine area scheduled for navigation is acquired by simply glancing the nautical chart information screen 31, when the corresponding license does not exist (including both cases when the license is not acquired in the first place, and the acquired license is expired), it can be determined that the license needs to be acquired from the provider.

Additionally, the nautical chart information display controller 23 of this embodiment varies the display mode of the recorded range display frame 34 depending also on whether the electronic nautical chart data is updated. Note that, whether the electronic nautical chart is updated can be determined based on whether the data of the electronic nautical chart is updated within a predetermined update cycle.

In this manner, the user can determine which electronic nautical chart has the latest data by simply glancing at the nautical chart information screen 31. For example, since the user can determine by simply glancing at the nautical chart information screen 31, whether the data of the electronic nautical chart for the marine area scheduled for navigation is the latest version, when the data is not the latest version, it can be determined that the data needs to be updated.

On the other hand, regarding the electronic nautical chart relating to a marine area which is not scheduled for navigation, urgent problems will not occur even if the data is not acquired, the license is not acquired, and/or the update is not performed. In other words, the electronic nautical chart which is not related to the navigation schedule may be ignored even if it is in an unavailable state. Regarding this, according to the configuration described above, since the information of the electronic nautical chart (specifically, recorded range) is displayed graphically on the rough chart, it can be instinctively grasped whether the corresponding electronic nautical chart is related to the navigation schedule, per recorded range.

As described above, according to the configuration of this embodiment, the user can easily grasp the status of the electronic nautical chart (e.g., whether it is available and whether it is updated) per acquisition unit, by simply viewing the display mode of the recorded range display frame 34 on the nautical chart information screen 31. Moreover, in this embodiment, since the recorded range of the electronic nautical chart is graphically illustrated in the rough chart 33 by the recorded range display frame 34, the user can easily grasp the marine area to which the electronic nautical chart is related, per acquisition unit. In this manner, the user can easily determine, for example, whether the data needs to be acquired, the license needs to be acquired, or the data needs to be updated, for each acquisition unit of the electronic nautical chart.

However, since the recorded range display frame 34 described above graphically displays the information relating to the electronic nautical chart in the rough chart 33, although it is suitable for instinctive reading of information, it is not suitable for reading detailed information, such as the number of electronic nautical charts without license.

Figure 6:
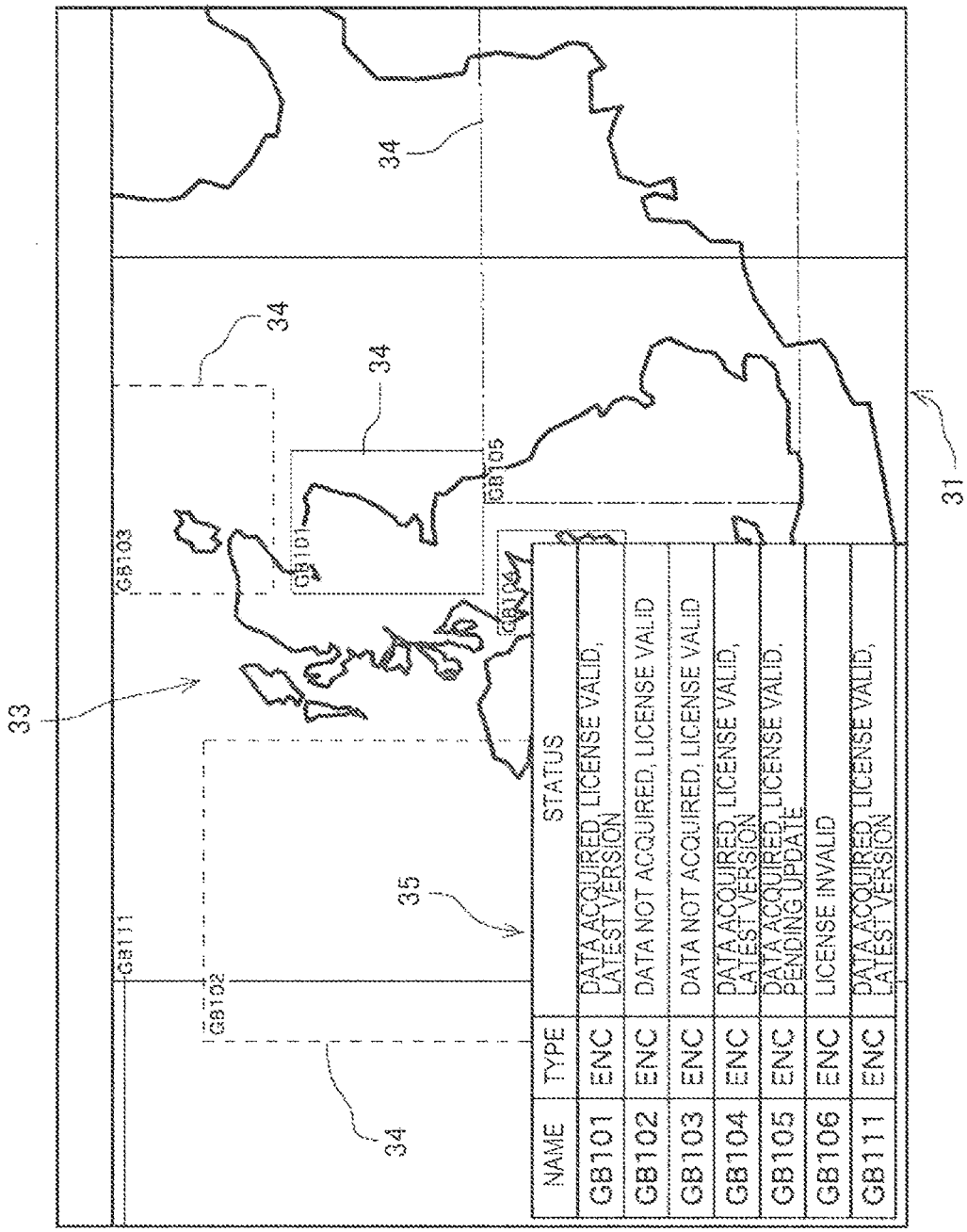
FIG. 6 is a view showing a state where a nautical chart information list is displayed on the nautical chart information screen in FIG. 3.

Thus, as shown in FIG. 6, the nautical chart information display controller 23 of this embodiment can display, as another mode of displaying the information relating to the electronic nautical chart, a nautical chart information list 35 in which the information of the electronic nautical charts is displayed into a list. The nautical chart information list 35 may be constantly displayed in the nautical chart information screen 31, or may be only displayed in the nautical chart information screen 31 when the user performs the predetermined operation.

The nautical chart information list 35 displayed by the nautical chart information display controller 23 lists up the information relating to the electronic nautical chart for each acquisition unit. The information to be displayed into the list includes the name of each acquisition unit of the electronic nautical chart and a type of the electronic nautical chart data. The information (e.g., name and type) of the electronic nautical chart for each acquisition unit can be acquired based on the catalogue data acquired by the electronic nautical chart catalogue acquirer 18. Since the catalogue data is also recorded with the information relating to the electronic nautical chart which is unpurchased by the user as described above, the information of the unpurchased electronic nautical chart can also be displayed into the list.

Moreover, the nautical chart information display controller 23 of this embodiment varies the display mode of the nautical chart information list 35 depending on the status of the electronic nautical chart. Specifically, in each row of the information of the electronic nautical chart in the nautical chart information list 35, a character string indicating a status of the corresponding electronic nautical chart is displayed (the "STATUS" column in FIG. 6). The user can specifically grasp the status of each electronic nautical chart by checking the character string.

Meanwhile, since the provided electronic nautical chart is for global marine areas, if all the information recorded in the catalogue data is listed up, the browsing property of the nautical chart information list 35 may degrade. Thus, the nautical chart information display controller 23 may display, in the nautical chart information list 35, only the information relating to the electronic nautical chart where the recorded range display frame 34 is displayed in the rough chart 33 (i.e., the information relating to the electronic nautical chart which is completely off the range from the rough chart 33, may be non-displayed in the nautical chart information list 35). In this manner, the user can suitably set the display range by changing in scale and/or scrolling the rough chart 33 so that only the information relating to the electronic nautical chart for the desired marine area is displayed on the nautical chart information list 35.

Moreover, the display contents in the nautical chart information list 35 may be sorted based on the content in each column. For example, it is preferred to be displayed by sorting such that the information relating to the electronic nautical chart without the license is preferentially displayed by the user performing the suitable operation. In this manner, the electronic nautical chart for which the license is needed can easily be grasped.

Next, a course setting by the electronic nautical chart display device 6 of this embodiment is described.

Figure 7:
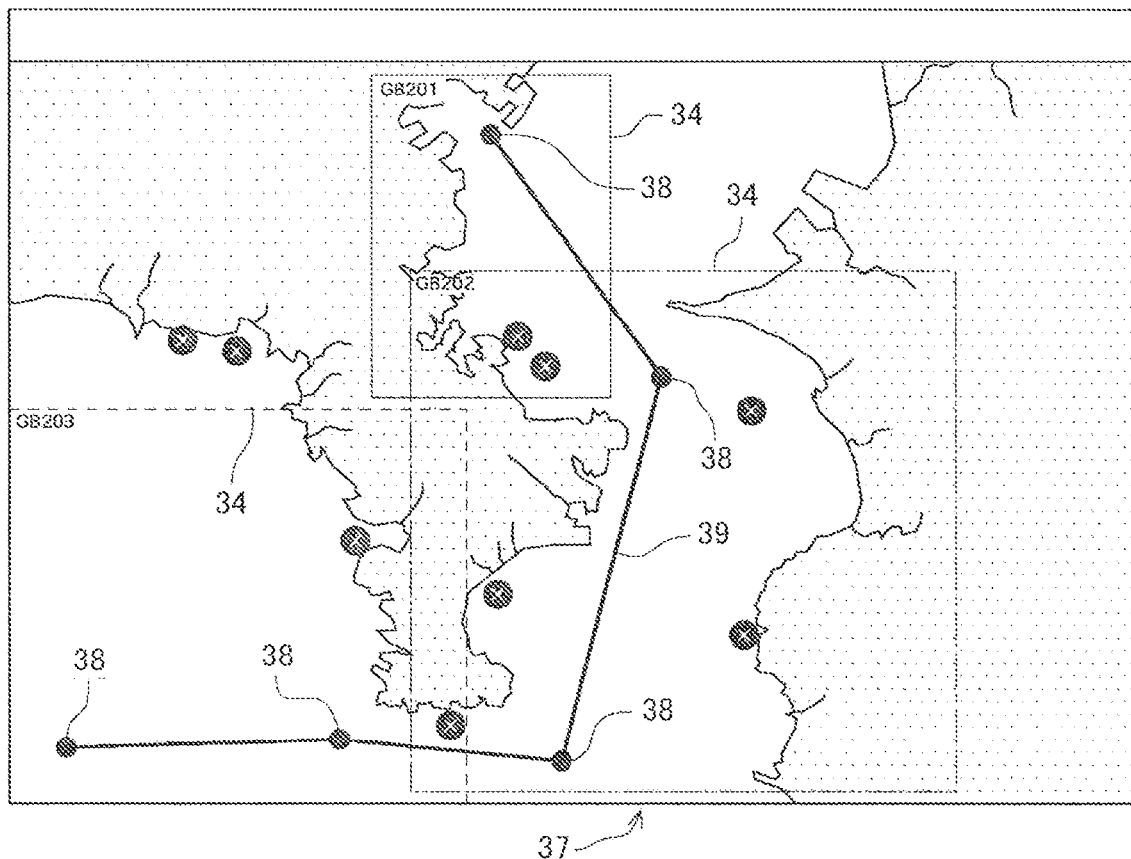
FIG. 7 is a view showing one example of a course planning screen.

The electronic nautical chart display device 6 can set a course scheduled for navigation (scheduled course). The scheduled course can be set by the user performing the suitable operation on a course planning screen. One example of a course planning screen 37 is shown in FIG. 7.

First, the user displays the electronic nautical chart of which the scheduled course can be displayed entirely, on a course planning screen 37. Then, the user sets a plurality of points 38 in the electronic nautical chart displayed on the course planning display screen 37. The course setter 24 subsequently couples the points 38 set by the user to each other so as to set a scheduled course 39. The course setter 24 displays the set scheduled course 39 by superimposing it on the electronic nautical chart on the course planning display screen 37 (FIG. 7).

The passing scheduled nautical chart information display controller 25 displays the information relating to the electronic nautical chart recording at least a part of the marine area where the scheduled course 39 passes. The passing scheduled nautical chart information display controller 25 firstly acquires the information showing each recorded range of the electronic nautical charts (including the electronic nautical chart which is currently available, and additionally, the electronic nautical charts which are currently not available, such as the unpurchased chart and the chart for which the license is expired), from the catalogue data. Next, the passing scheduled nautical chart information display controller 25 extracts the information of the electronic nautical chart recording at least the part of the marine area where the scheduled course 39 set by the course setter 24 passes, among the information acquired from the catalogue data. Then, the passing scheduled nautical chart information display controller 25 displays the recorded range display frame 34 indicating the recorded range of the extracted electronic nautical chart by superimposing it on the electronic nautical chart on the course planning display screen 37 (FIG. 7).

In this manner, it can be such that only the information of the electronic nautical chart relating to the scheduled course is displayed on the course planning display screen 37. The user can easily grasp the electronic nautical chart required for navigating the set course per acquisition unit by checking the recorded range display frame 34 and the scheduled course 39 displayed on the course planning display screen 37. Moreover, the passing scheduled nautical chart information display controller 25 varies the display mode of the recorded range display frame 34 depending on the status of the electronic nautical chart. Note that, the description of the display mode of the recorded range display frame 34 is omitted, since it is already described above.

According to the above configuration, the user can determine the status of the electronic nautical chart required for navigating the set scheduled course 39 by glancing. Therefore, for example, when the license of the electronic nautical chart for the marine area where the scheduled course 39 passes is not acquired (is expired), it can be determined that the license needs to be acquired from the provider.

Moreover, the passing scheduled nautical chart information display controller 25 may be able to display into a list, the statuses of the electronic nautical charts recording at least the part of the marine area where the scheduled course 39 passes. In this manner, the user can more specifically grasp the status of each electronic nautical chart required for navigating the set scheduled course 39.

As described above, the electronic nautical chart display device 6 of this embodiment can acquire and display the electronic nautical chart per acquisition unit, and is configured as below. Specifically, the electronic nautical chart display device 6 includes the nautical chart information display controller 23. The nautical chart information display controller 23 determines whether the electronic nautical chart is currently available per acquisition unit, as well as displays the information relating to the electronic nautical chart per acquisition unit depending on whether the electronic nautical chart is currently available.

Figure 8:
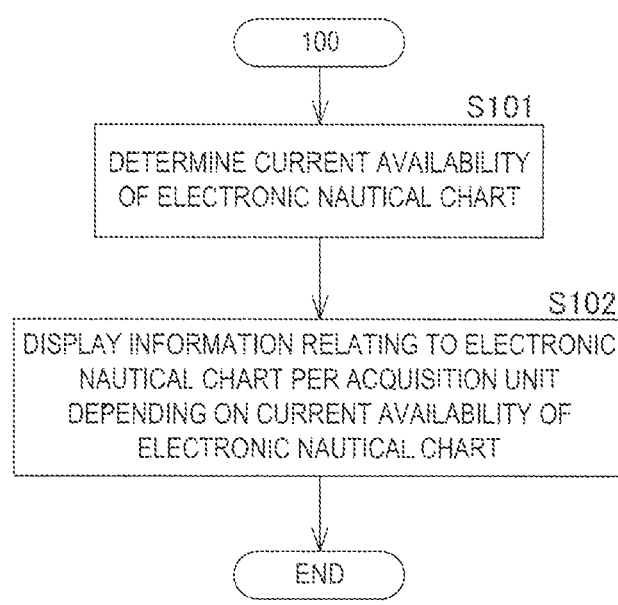
FIG. 8 is a flowchart showing a method of displaying information relating to the electronic nautical chart, which is performed by the electronic nautical chart display device according to the embodiment.

Therefore, a method of displaying the information relating to the electronic nautical chart, which is performed by using the electronic nautical chart display device 6 (100) is as follows. Specifically, with reference also to the flowchart in FIG. 8, the display method includes determining whether the electronic chart is currently available per acquisition unit (S101), and displaying the information relating to the electronic nautical chart per acquisition unit depending on whether the electronic nautical chart is currently available (S102). Note that, a part of the components of the control unit 12 may be configured as software.

As described above, by differentiating the display mode of the information depending on the status of the electronic nautical chart, the status of the electronic nautical chart can easily be grasped per acquisition unit.

As above, the suitable embodiment of the present invention is described. The above configuration may be modified as follows.

In the above embodiment, although the line type of the recorded range display frame 34 is varied depending on the status of the electronic nautical chart, it is not limited to this, and various kinds of display modes can be considered, for example, changing the color of the line of the recorded range display frame 34 depending on the status of the electronic nautical chart.

Moreover, in the above embodiment, the exterior edge of the recorded range is displayed to display the recorded range of the electronic nautical chart. However, as the display method of the recorded range of the electronic nautical chart, it is not limited to displaying the recorded range by framing, and, for example, the recorded range may be indicated by hatching.

The kinds of statuses of the electronic nautical chart are limited to the above. For example, as shown in FIG. 5, the display mode of the information relating to the electronic nautical chart may be varied based on an occurrence of error when installing the electronic nautical chart data.

Moreover, the mode of graphically displaying the information of the electronic chart in the rough chart is not limited to the frame. For example, icons corresponding to the statuses of the respective electronic nautical charts may be displayed by being superimposed on the rough chart. Here, a position for displaying each icon on the rough chart may be a position corresponding to the central coordinates of the recorded range of each electronic nautical chart.

The electronic map display device is not limited to the device for displaying the electronic nautical chart for ships, and it may widely be applied to other devices for displaying a map provided in an electronic data form, such as a navigation device for automobiles.

In the foregoing specification, specific embodiments of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. An electronic map display device for displaying a status for each of a plurality of electronic maps, comprising:
a display; and a processor and an associated memory, the processor being configured to execute:

a map information display determiner program stored in the memory for determining whether each of the electronic maps is currently available;

a map information display interface program stored in the memory for displaying electronic maps information for each of the electronic maps showing an exterior edge of a range recorded in each of the electronic maps, wherein the exterior edge conveys information about whether the electronic map is currently available; and a rough map display controller program stored in the memory for displaying a rough map in a display mode where the rough map is at least changeable in scale and scrollable, wherein the map information display interface graphically displays the exterior edge of the electronic map by superimposing on the rough map; wherein the rough map display controller program stored in the memory displays the rough map by Mercator projection when the scale of the rough map is larger than a predetermined scale, and displays the rough map by orthographic projection when the scale of the rough map is smaller than the predetermined scale; and the map information display interface program stored in the memory displays on the display the electronic map information depending on the display mode of the rough map.

2. The device of claim 1, wherein the map information display interface program displays statuses of the respective electronic maps into a list, as the information relating to the electronic maps.

3. The device of claim 1, wherein the processor is further configured to execute:

a route setter program stored in the memory for setting a scheduled route as well as displaying the scheduled route by superimposing on displayed electronic map data; and a passing schedule map information display controller program stored in the memory for graphically displaying the exterior edge of each of the electronic maps showing at least a part of an area where the scheduled route passes, wherein the passing schedule map information display controller program varies the display mode depending on whether the electronic map corresponding to the area on the route is currently available.

4. The device of claim 1, further comprising:

a route setter program stored in the memory for setting a scheduled route; and a passing schedule map information display controller program stored in the memory for displaying statuses of the respective electronic maps into a list, each electronic map recording at least a part of an area where the scheduled route passes.

5. A method of displaying a status for each of a plurality of electronic maps, comprising:

determining whether each of the electronic maps is currently available; and displaying electronic maps information for each of the electronic maps showing an exterior edge of a range recorded in each of the electronic maps, wherein the exterior edge conveys information about whether the electronic map is currently available;

wherein the exterior edge of the range recorded in each of the electronic maps and the information about whether the electronic map is currently available are displayed by Mercator projection when a scale of a rough map is larger than a predetermined scale, and are displayed by orthographic projection when the scale of the rough map is smaller than the predetermined scale.

6. The method of claim 5, further comprising displaying statuses of the respective electronic maps into a list, as the information relating to the electronic maps.

7. The method of claim 5, further comprising:

setting a scheduled route as well as displaying the scheduled route by superimposing on displayed electronic map data; and graphically displaying the exterior edge of each of the electronic maps showing at least a part of an area where the scheduled route passes, wherein the display mode is varied depending on whether the electronic map corresponding to the area on the route is currently available.

8. The method of claim 5, further comprising:

setting a scheduled route; and displaying statuses of the respective electronic maps into a list, each electronic map recording at least a part of an area where the scheduled route passes.

* * * * *